United States Patent [19]

Kulpa et al.

[11] 4,433,836
[45] Feb. 28, 1984

[54] END OF STACK SENSOR

[75] Inventors: Walter J. Kulpa, Norwalk; John R. Paulik, Newtown, both of Conn.

[73] Assignee: Pitney Bowes Inc., Stamford, Conn.

[21] Appl. No.: 309,868

[22] Filed: Oct. 9, 1981

[51] Int. Cl.³ .............................................. B65H 3/04
[52] U.S. Cl. ....................................... 271/3.1; 271/301
[58] Field of Search ............................. 271/3.1, 301, 4

[56] References Cited

U.S. PATENT DOCUMENTS

| 4,164,347 | 8/1979 | McGrain | 271/3.1 |
| 4,169,674 | 10/1979 | Russel | 271/3.1 X |
| 4,269,406 | 5/1981 | Hamlin | 271/3.1 X |

OTHER PUBLICATIONS

Research Disclosure, No. 158, pp. 33, 34, Jun. 1977, 15842, "Separator Member Return Means".

Xerox Disclosure Journal, vol. 5, No. 4, Jul./Aug. 1980, "Segmented Friction Drive", Timothy S. Pinckney.

Primary Examiner—Richard A. Schacher
Attorney, Agent, or Firm—Martin D. Wittstein; William D. Soltow, Jr.; Albert W. Scribner

[57] ABSTRACT

Within a recirculating sheet feeding apparatus capable of feeding sheets from a back to a stack support, a set separation device having an elongated separator member is arranged to distinguish between cycles of feeding a given stack of sheets. The separator member is mounted with respect to the stack of sheets so that it rotates alongside one edge of the sheets, and past the adjacent edge when the last sheet from the stack is fed. A drive mechanism enables the separator member to rotate beneath the sheet stack support back to the topmost sheet in the stack when the member passes through an aperture in the stack support.

4 Claims, 5 Drawing Figures

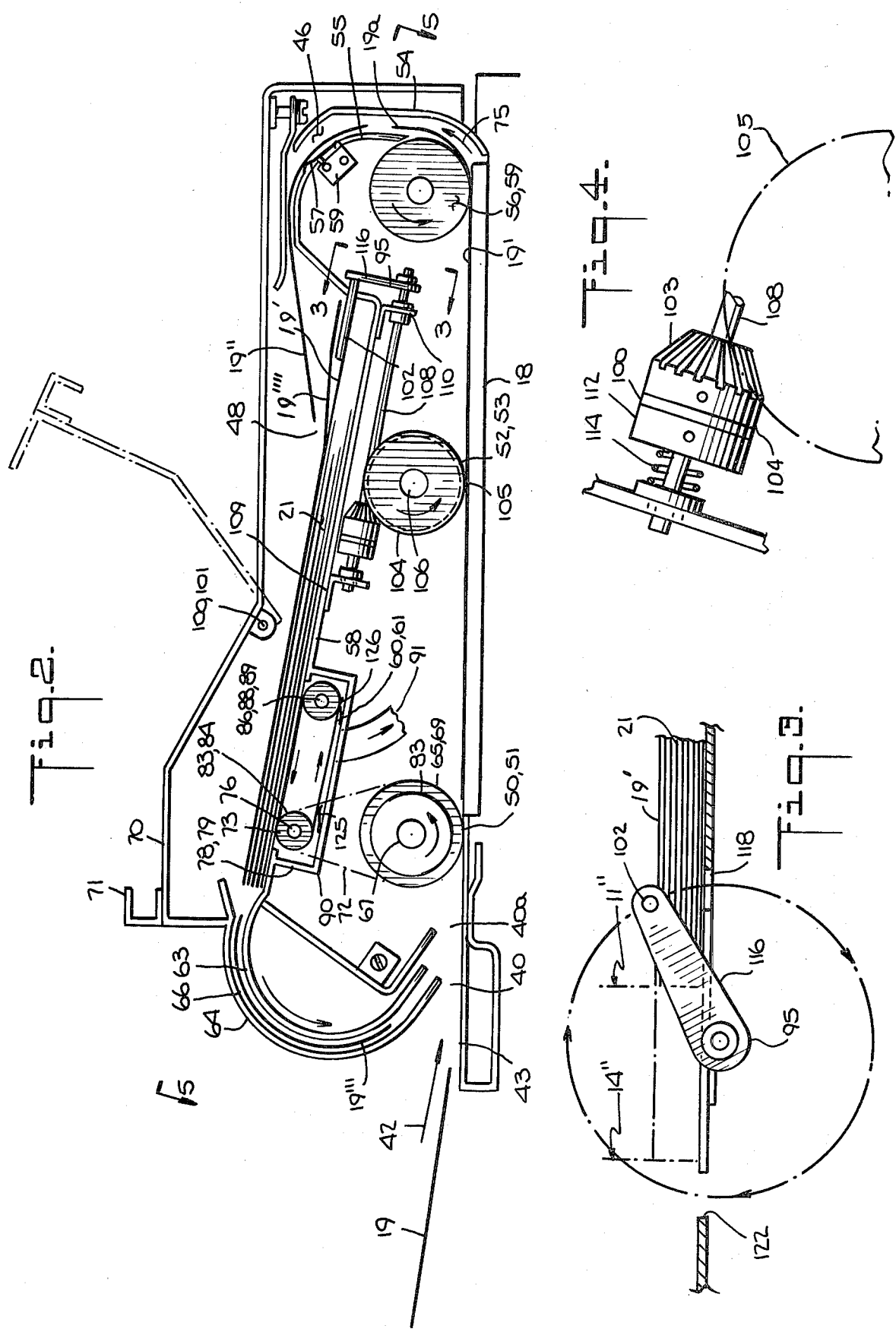

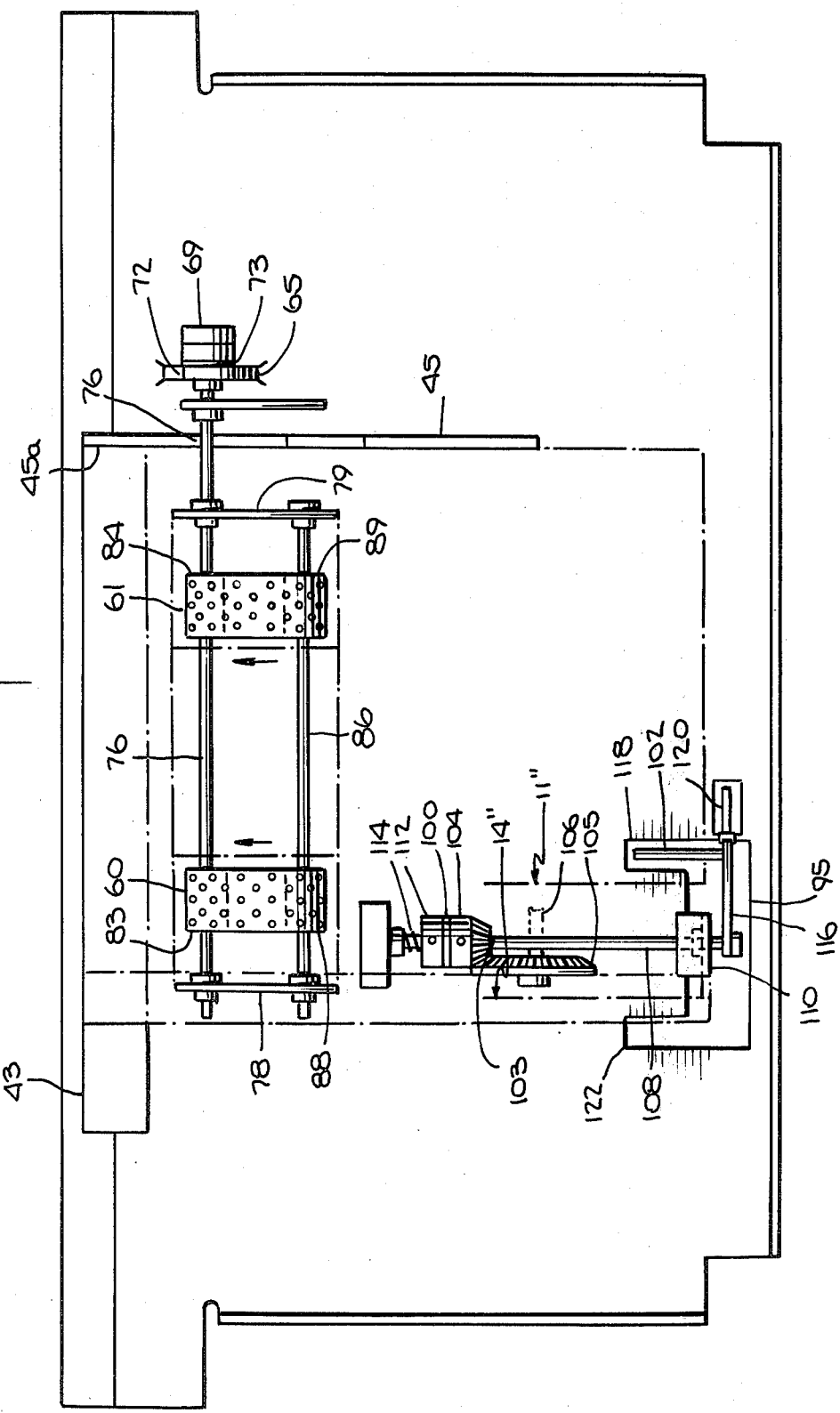

END OF STACK SENSOR

BACKGROUND OF THE INVENTION

The present invention relates to stacking of sheets within sheet feeders and particularly to a separation apparatus for use with a recirculating sheet feeder. The recirculating sheet feeder described herein also may be utilized as a stream feeder, or changed according to the operator's requirements to a set generating mode where multiple copy sets are produced.

A recirculating sheet feeder is one which is particularly suited for mounting upon a copier. The typical copier has a horizontally positioned glass platen over which sheets are fed successively beneath the feeder, after having been separated from a stack of sheets located at the top of the feeder.

The original sheet stack is typically loaded with the first document on top, face up. From this stack each sheet is separated, transported and positioned face down upon the illumination station, overlying the glass platen of the copier. The sheets are generally automatically fed seriatim to the glass platen where they are temporarily registered and positioned in an appropriate processing station such as over the copier optics and illumination system. Immediately thereafter, the sheets are transported away from the registration position on the platen processing station and are conveyed back to the stacking area, which is located at the top of the feeder apparatus.

Within the typical recirculating feeder, there are many instrumentalities included to facilitate the automatic sheet handling capabilities of the device. The present invention is particularly considered to be one of the important functional devices of the feeder since it serves to separate the original sheets in sets as required to produce multiple sets of copies as desired by the machine operator. The separator mechanism endlessly separates the sheets being singly fed from the original stack from those being forwarded back to the stack support after exposure at the process station.

At such time that the complete original sheet stack has been fed to the platen and returned, the sheet set separator device automatically resets to its original starting position for initiation of another copy set. Each cycle of the separator in effect represents a copy set, and is therefore countable by means of appropriate sensing and counting apparatus which monitors the separator cycles. The cycles counted from the separator device count down through controls provided within the copier until the count agrees with the original program for copy sets as required by the operator.

PRIOR ART

In U.S. Pat. No. 4,164,347, issued to T. M. McGrain, a Separator Member Drive Mechanism is disclosed which provides a drive mechanism for rapidly engaging and disengaging the separator member. The mechanism includes means for rotating the separator member through use of a plurality of pawls, which are part of the separator apparatus and which are mounted for movement between a first and second portion.

The pawls further insure return of the separator member to the initial starting position in the required time interval presented between sets, relative to the document copying cycle in the machine.

In U.S. Pat. No. 4,078,781 to Burlew, Hogan and Reid, the functions of another recirculating document feeder are further described in detail. Among the instrumentalities described is a separator member which rotates incrementally and eventually drops through an opening in the floor plate comprising the document support plate, when the last document has been fed. Also, when the feeder is placed into a multiset mode, the separator is moved by suitable drive means into the remaining topmost sheet in the stacker after completion of each set.

However, there is several problems associated with the separator devices described in the foregoing named patents. For example, in the separator apparatus described in both patents, a shift in the location of the document stop member for the lead edge of the documents is required in order to accommodate different length sheets. In addition, the separator disclosed specifically in U.S. Pat. No. 4,164,347 requires a separate timing switch to ensure the correct starting position. The switch must also sense dislocation of the actuator pawls engaged with the separator finger mechanism in the event of such a circumstance.

SUMMARY OF THE INVENTION

The present invention comprising a sheet separation apparatus is arranged in a recirculating sheet feeding apparatus in which a plurality of sheets are fed successively from one surface of a stack resting on a support surface. The sheet feeder has the ability to transport the successively fed sheets to a processing station, and then return the sheets to the support for the stack of sheets. There is an elongate separator member adapted to normally contact the outermost top sheet of the stack of sheets. The member is mounted upon an arm arranged adjacent one edge of the sheet stack so that the elongate portion of the member extends over the outermost top sheet.

When the last sheet in the stack is fed, the normally inoperative elongate member is rotatably driven around another adjacent edge of the stack through an aperture provided in the stack support. The elongate member is thus returned to the topmost sheet of the restacked stack of sheets.

It is an object of the present invention to provide a separator device arranged near two adjacent edges of a stack of sheets in order to accommodate at least two different lengths of sheet material.

It is a further object of the present invention to provide a document separator device which is simply driven by a normally inoperative device.

DESCRIPTION OF THE DRAWINGS

FIG. 2 is a partial section generally taken through 2—2 of the sheet feeder of FIG. 1.

FIG. 3 is an enlarged partial section end view of the invention taken along lines 3—3 from FIG. 2.

FIG. 4 is an enlarged view of FIG 2, showing a portion of the drive apparatus of the invention.

FIG. 5 is a partial plan view of the sheet feeder of FIG. 2 taken generally along the lines 5—5 with the uppermost covers substantially removed.

Figure 1:
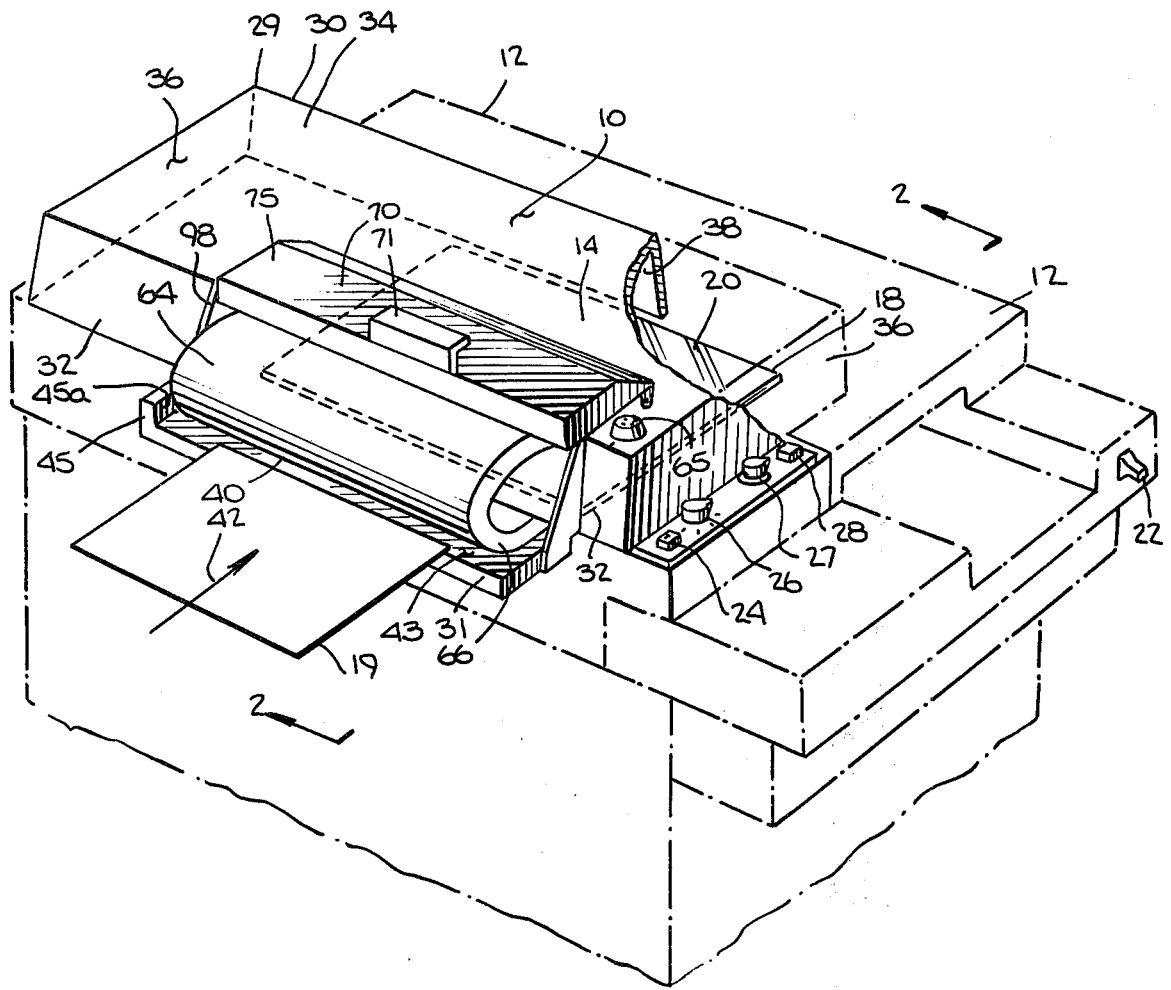
FIG. 1 is a fragmentary perspective view of a copier including a recirculating sheet feeder.

Shown in FIG. 1 a recirculating style sheet feeder 10 is suitably, removably mounted on the upper portion of a copier 12, over the illuminating station 14. The copier 12 has suitable supporting structure, for the various processing apparatus typical and instrumental in the electophotographic art. Also included in the supporting structure of the copier, a glass platen 18, (FIG. 2), which forms the support for sheet material fed across the platen 18 during the illumination portion of the copying process.

The internal processing instrumentalities include a photoconductor, and various other instrumentalities, (not shown) for preparing the photoconductor for development of an image of each sheet presented upon the glass platen 18. All associated instrumentalities are included in the copier for the purpose of reception, development and production of the original sheet image. There is included copy sheet transport apparatus and a supply of copy paper which receives and retains the transferred original image after the copier process has been completed.

There is included in the copier 12 electro-mechanical processing controls for the convenience of the machine operator. Referring to FIG. 1, there is a main power switch 22, and an operator print command switch 24 for initiating a copy cycle of the copier 12. There is a first selector switch 26 for choosing the number of copies desired, and a second selector switch 27 for adustment of the copy output contrast through a dark to light range. There is a resettable stop print switch 28, and a control knob 65 associated with the recirculating document feeder 10 for providing the operator with a means of selecting the number of copy sets desired from a given set of original sheets.

The recirculating feeder 10 (FIG. 1) has an upper housing 29 including a cover 30, and a frame 31 on which the cover 30 is removably mounted by suitable fastening devices (not shown). The cover 30 includes a front wall 32, a top wall 34, opposing side walls 36 and a rear wall 38.

The following specification is intended to demonstrate the usefulness of the present invention as an end of stack sensor for sheets, embodied within an automatic recirculating sheet feeder. However, the sheet feeder 10 also may be utilized as a stream feeder where such individual sheets 19 are accepted one at a time and processed.

To assist in the understanding of the functions of the sheet feeder 10, there exists a detailed explanation of the stream feed sheet handling version within U.S. Pat. No. 4,110,038 issued to Robert Irvine, Harry Luperti, and Robert E. Manna on Aug. 29, 1978. This particular patent describes the sheet stream feeder instrumentalities including sheet acceptance, advancement, registration control, and sensing devices which control and communicate with the copier 12.

Since the present invention functions within the feeder 10 apparatus defined herein, and is directly related to the set separation function required within the feeder 10, the following detailed explanation is presented.

The front wall 32 and the frame 31 of the feeder 10 combine to form a sheet loading aperture 40 (FIG. 1). Sheets are presented to the sheet entry aperture 40 generally in a sideways manner, such as illustrated in FIG. 1 by a sheet 19. Each sheet 19 may be inserted individually in the general direction indicated by the arrow 42. The sheet 19 is guided and supported by the underlying platform 43 which extends into the sheet feeder 10. The platform 43 is arranged to be parallel with respect to the top of the platen glass 18 of the illumination platen 14. Also, the typical sheet 19 is manually edge-aligned by the machine operator by means of guiding along a fixed edge registration wall 45a formed from the abutment 45.

Under the top wall cover 34 of the feeder 10 (FIG. 1), there is a sheet exit aperture 46 (FIG. 2), which permits each successive sheet 19 previously processed to be guided and restacked in the sheet stacking and receiving chamber 48.

During the individual sheet 19 loading process, the machine operator feeds the sheets seriatim through the loading aperture 40, from which the sheet 19 is transported onto the illuminating glass platen 18 by the initial appropriate pairs of sheet transport wheels 50, 51 and 52 and 53. Once registered on the platen 18, the sheet is automatically exposed by the copier 12 illumination instrumentalities which are triggered by a sheet sensing switch, (not shown) located in the sheet entry aperture 40a. After completion of each exposure cycle upon the glass 18, the sheet transport apparatus including the pairs of feed rollers 52, 53, and 56 and 59 cooperate to advance a given sheet 19 from the illumination glass platen 18 process station in a direction indicated by the arrow 75.

During the advancement and transport of sheet 19, the sheet guide plates 54 and 55 cause the leading edge of the sheet 19 to reverse direction 180 degrees from the original sheet insertion feed path, (arrow 42). While the leading edge 19a of feed sheet 19 is channeled through the guide plates 54 and 55, the edge 19a will engage the switch trip arm 57 which is operatively connected to the switch 59. There is appropriate mounting apparatus provided in the form of brackets and clamping devices (not shown), which serve to position and hold the sheet sensing switch 59. Each separate sheet 19 is progressively transported by the feeder instrumentalities in a direction opposite operator insertion to the original operator insertion feed direction towards the sheet receiving chamber 48. The operator keeps feeding the single sheets 19, until he or she has completed the initial loading of a given set of original sheets 21 into the chamber 48. Appropriately, a single set of copy sheets is delivered to the operator at the copier output tray (not shown).

If one set is desired, no further automatic processing is required by the sheet feeder 10. In this case, the operator merely opens the enclosure formed into the cover 70, by means of the convenient handle 71, (FIGS. 1 and 2). Enclosure cover 70 pivots backwards and opens so that the machine operator can pick up the stacked set of original sheets 21 according to his or her requirements.

On the other hand, if two or more sets of copies are required, the previously machine control knob 65 is utilized and a fully automatic sheet feeder system mode is energized, without the need for the operator to rehandle the stack of original sheets 21.

In a case where several sets of copies are required by the machine operator, as previously described the operator has selected the quantity of sets desired through the control knob 65.

And, in either case where the original sheets 19 have been either stream fed into the feeder 10, or placed as a set into the sheet holding/receiving chamber 48, the automatic controls included in the sheet feeder 10 and copier 12 function to deliver the copy sets in the copier output tray. For advancing the sheets from the stack 21, there is disposed under the sheet support platform 58 (FIG. 2 and FIG. 5), a pair of appropriate vacuum belts 60 and 61 which function to cause seriatim separation of the sheets 19.

Referring further to (FIG. 2), the path of a given separated sheet 19''' is seen being channeled through a guide path 66, provided between the curved sheet guide members 63 and 64 which are appropriately secured and fastened to the frame wall portions (not shown) of the feeder 10. A given sheet 19''' is pushed forward through guide path 66 until its leading edge enters the sheet inlet aperture 40a and is further engaged by the driven feed wheels 50 and 51. Then each sheet 19''' continues to the registration position upon the glass platen 18, as it would in the hand fed stream feed mode.

The perforated separator vacuum belts 60 and 61 are rotatably engaged by means of rotative power provided through connective mans associated with a flexible timing member 72. A shaft member 67 is appropriately journaled in the feeder 10 frames (not shown), so that one end of the shaft member 67 supports the sheet transport rolls 50 and 51. The shaft 67 supports a electromagnetic clutch member 69, partially shown in FIG. 5. The clutch member 69 has suitably included an appropriate timing member 65 suitably rotatably attached to one end of the shaft 67, along with the timing drive member 65. And, the member 65 is engaged with the flexible timing member 72. The flexible timing member 72 is also engaged with a timing member 73 which is suitably fastened on a shaft 76. The shaft 76 is appropriately rotatably supported from vertically disposed bracket legs 78 and 79, (FIG. 5), which are suitably formed from the sheet support platform 58.

The vacuum belts 60 and 61 are appropriately journaled upon separate mounting pulleys 83 and 84 which are connectively engaged with shaft 76. In addition, there is a shaft 86, (FIGS. 2, 5) which is similarily mounted as shaft 76, thereby forming a follower and support for the belts 60 and 61. There are additional support pulleys 88 and 89 which are appropriately attached to shaft 86 in order to provide the necessary vertical location of the sheet feed surfaces of the vacuum belts 60 and 61 with respect to the sheet stack 21.

Partly shown in FIG. 2, there is also provided a box-like structure 90, which forms an airtight chamber for the application of the sheet separation, vacuum system. There is an appropriate vacuum tube 91 partially shown, which is attached to the vacuum box structure 90 beneath each belt 60 and 61. The tube 91 leads to an appropriate negative source for the sheet feed operation through the perforated vacuum feed belts 60 and 61. There are seals, 125 and 126 partially shown in FIG. 2 which serve to restrict the vacuum to the feed surfaces of belts 60 and 61.

The automatic sheet feed mode is continuous and as previously described is programmed by the machine operator. Each sheet is successively fed by the separator belts 60 and 61 which are caused to rotate sufficiently to cause each document to be gripped by the initial sheet transport feed wheels 50 and 51.

And, the next sheet to follow is only fed after switch 59 (FIG. 2) has sensed the leading edge of a previously fed sheet 19''. This procedure continues while switch 59 monitors and communicates with the copier 12 as to the progression of the individual sheets 19 through the feeder 10 sheet path.

The separation of the original sheets from one feed cycle to the next is also monitored mechanically by the invention included within the apparatus 95 which is shown in detail in FIGS. 2, 3, 4 and 5.

The original sheet set separation mechanism 95 (FIG. 2), is driven by a simple mechanical friction system 103, generally depicted within FIG. 4. The separator member 102 must be urged gently in a downward direction as the sheet stack 21 height is reduced by seriatim feed of the sheets 19''' from beneath stack 21. This gentle urging by the separator member 102 continues to ensure that the member 102 remains in contact with the remaining document stack 21 which has not been fed.

To provide the necessary gentle urging motion to the separator member 102, a mechanical drive system 103, (FIG. 4) including a bevel gear 104 is arranged to mesh with its cooperating mating gear 105. Gear 105 is connectively engaged coaxially on the same support shaft 106 as the sheet feed wheels 52 and 53. The bevel gear 104 is conveniently rotatably mounted by means of suitable bearings on a supporting shaft 108 which is itself also rotatably journaled in bearings pressed into brackets 109 and 110. The brackets 109 and 110 are secured (by means not shown), to the underside of the sheet receiving platform 58.

Referring to FIG. 4, there is coaxially mounted with the gear 104, a pressure friction plate 100 which is rotatably connected with a suitable mounting hub 112. The hub 112 is connectively attached to the shaft 108 and axial pressure is applied to the hub 112 from a compression spring 114. The shaft 108 is caused to rotate through friction in a CW direction when viewed from the rear of the feeder 10. The CW rotation allows the elongate separator member 102, which is attached to an arm 116 to revolve around the adjacent end edge of the sheet stack 21 since the arm 116 is attached to the driven shaft 108.

When the last sheet 19' of a given set of sheets 21 is fed towards the platen 18, the member 102 passes through an aperture 118 provided in the floor of the document support platform 58. At such time as the member 102 does pass through the aperture 118, an electrical switch 120 (FIG. 5) is enabled which further provides a signal to the copier logic and document feed controls that a copy set has been completed. The member 102 then revolves under the completely restacked sheet stack 21, (FIG. 3) and comes up through an aperture 122, which is an extension of aperture 118 within the platform 58. The member 102 continues revolving until it stops against the top of the document stack 21. The gear arrangement of gears 104 and 105 are selected so that the arm 116, and the stack separator member 102 revolve at a rate allowing a given sheet 19'' to restack on the top of stack 21. This ensures that the member 102 has sufficient time to reposition on the last sheet 19'' of the last set fed off the original stack 21 prior to refeeding a first sheet 19'''' of the same original stack 21. When necessary the separator apparatus then repeats its previous function for example, in the case where more than two copy sets are desired.

While one embodiment of the present invention has been disclosed herein, it will be obvious to those skilled in the art to make changes in the size, shape, detail and general arrangement of the invention captured within the spirit and scope of the following claims.

What is claimed is:

1. In a recirculating sheet feeding apparatus in which a plurality of sheets are fed successively from one surface of a stack thereof to a processing station and then returned to the opposite surface of the stack, a device for determining when all of the sheets in the stack have been fed to the processing station and returned to the stack, said device comprising:

a. support means for supporting a stack of sheets to be fed successively to the processing station, said support means including an aperture therein located so as to normally be obstructed by said stack,
b. feeding means for feeding sheets successively from one surface of said stack to the processing station and for returning the sheets to the opposite surface of said stack, the returning of said sheets to said stack defining a trailing edge and side edges of said stack,
c. an elongate separator member adapted to normally contact the outermost sheet of said stack,
d. mounting means disposed adjacent said stack for mounting said elongate separator member to extend inwardly relative to said stack from said trailing edge thereof and for rotating said elongate separator member through said aperture and around one of said side edges of said stack after said outermost sheet of said stack has been fed to said processing station and returned to said stack so that said elongate separator member again contacts said outermost sheet, said mounting means comprising a rotatable shaft mounted on said support means and an arm mounted on said shaft for rotation therewith in a plane adjacent and parallel to said trailing edge of said stack, said elongate separator member being mounted on said arm such that said elongate separator member moves in an orbital path around said shaft, and
e. drive means operable to move said mounting means to cause said rotation of said elongate separator member whereby each rotation of said elongate separator member provides an indication that all of the sheets in said stack have been fed to said processing station and returned to said stack.

2. A device as set forth in claim 1 wherein said separator member is sufficiently long and is mounted on said arm sufficiently remote from said shaft so that said orbital path of said separator member is sufficiently large to accommodate stacks of varying length relative to said trailing edge of said stack.

3. A device as set forth in claim 1 wherein said drive means is driven by said feeding means and wherein said drive means is inhibited from rotating said separator member through said aperture only where said aperture is obstructed by any sheets in said stack.

4. A device as set forth in claim 1 wherein said drive means comprises a bevel gear coaxial with said shaft and rotatable with respect thereto, said bevel gear being arranged to mesh with a cooperating mating gear driven by a drive for said feeding means, a hub connectively attached to said shaft, and a pressure friction plate disposed between said bevel gear and said hub whereby said elongate separator member applies a gentle urging pressure upon said stack until all of the sheets have been fed whereupon said aperture is no longer obstructed and said drive means rotates said shaft for orbiting said separator member onto said outermost sheet.

* * * * *